United States Patent Office 3,563,958
Patented Feb. 16, 1971

3,563,958
ESTERIFICATION OF ARYLMETHYLENE SULFONIUM RESINS WITH N - PROTECTED AMINO ACIDS FOR USE IN SOLID - PHASE PEPTIDE SYNTHESIS
Linneaus C. Dorman, Midland, Mich., assignor to The Dow Chemical Company, Midland, Mich., a corporation of Delaware
No Drawing. Filed Apr. 2, 1968, Ser. No. 718,241
Int. Cl. C07c 103/52; C08g 20/08
U.S. Cl. 260—78          10 Claims

ABSTRACT OF THE DISCLOSURE

The Merrifield solid-phase peptide synthesis is improved by bonding the amino acid to the supporting resin through reaction of an N-protected amino acid (I) with an arylmethylene sulfonium resin (II) to form an amino acid resin benzyl ester (IV):

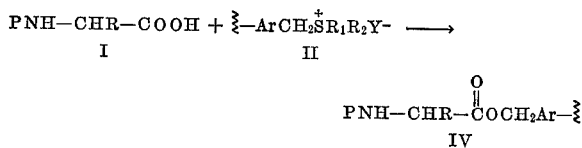

Advantages of this process include broader scope, mild conditions, higher resin ester capacities and improved yields. Highest yields are obtained when a basic salt of the sulfonium resin is used.

BACKGROUND

Since its inception, The Merrifield solid-phase peptide synthesis (Federation Proc. 21, 412 (1962); J. Am. Chem. Soc., 85, 2149 (1963)) has been widely used. In essence an insoluble aromatic resin is employed as a support to facilitate product isolation and recovery during the stepwise synthesis or degradation of a peptide. Particularly effective is bonding an amino acid to a resinous styrene-divinylbenzene copolymer with a benzyl ester group. However, the known processes for preparing such benzyl esters are marred by poor yields.

Hwa U.S. Pat. 2,895,925 describes the synthesis of arylmethylene sulfonium resins for halomethylated aromatic polymers. By reaction with an amino acid salt as disclosed by Hatch U.S. Pat. 3,300,416, such sulfonium resins can be converted into benylamine ion-exchange resins. Also Morgan et al. U.S. Pat. 3,146,157 teaches the use of a mixture of polysulfonium and polycarboxylate resins as a wet-strength additive for paper.

SUMMARY OF THE INVENTION

It has now been discovered that the solid-phase peptide synthesis is improved by attaching the amino acid to an aromatic resin support through reaction with an improvement comprises: (A) Contacting an arylmethylene sulfonium polymer with a solution of an N-protected amino acid or salt thereof to form a sulfonium carboxylate salt; and thereafter (B) Heating the sulfonium carboxylate salt to form a benzylic ester thereby attaching the N-protected amino acid to the aromatic resin support. The reactions are shown in Equations 1A and 1B:

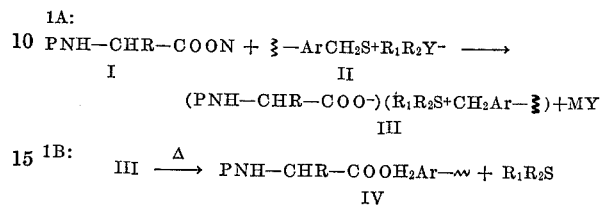

where

PNH—is a protected amino group,
R is the remaining portion of the amino acid molecule;
M is a cation;
$-ArCH_2-$ is an aromatic polymer containing an arylmethylene group;
$R_1$ and $R_2$ are alkyl groups; and
$Y^-$ is the counteranion.

In a preferred embodiment, the N-protected amino acid is reacted with an arylmethylene sulfonium resin in a basic salt form, i.e., $Y^-$ is a basic anion. Preferably the basic anion is bicarbonate, carbonate or hydroxide.

The resulting benzyl ester (IV) with the aromatic resin functioning as a support can then be used in the synthesis of polypeptides and other biologically important materials. For example, after removing the group P protecting the amino group, a second suitably protected amino acid or other reactant can be chemically attached to the free amino group to build up stepwise a di-, tri- or higher peptide. Alternately such a resin supported polypeptide can be used in a stepwise degradation.

The improved esterification process permits the use of a wide range of soluble and insoluble aromatic polymers as supporting substrates. The esterification conditions are compatible with N-protected amino acids containing substituent amide or hydroxyl groups which cannot be used in prior esterification processes. Resin capacities of about 0.1–4.0 meq. benzyl ester/g. dry resin are feasible with 85–100% yields.

GENERAL DESCRIPTION

N-protected amino acids (I)

This improved process is operable with a wide variety of N-protected amino acids of the Formula I:

where P is a conventional amine protective group compatible with the process conditions, R is the remaining portion of the amino acid molecule and M is a cation such as H+, NA+, K+, Li+, (CH₃)₄N+ etc. Typical examples of suitable protected amino acids include:

The arylmethylene group can be part of the resin polymer chain or pendent thereto. The particulate poly(halo-

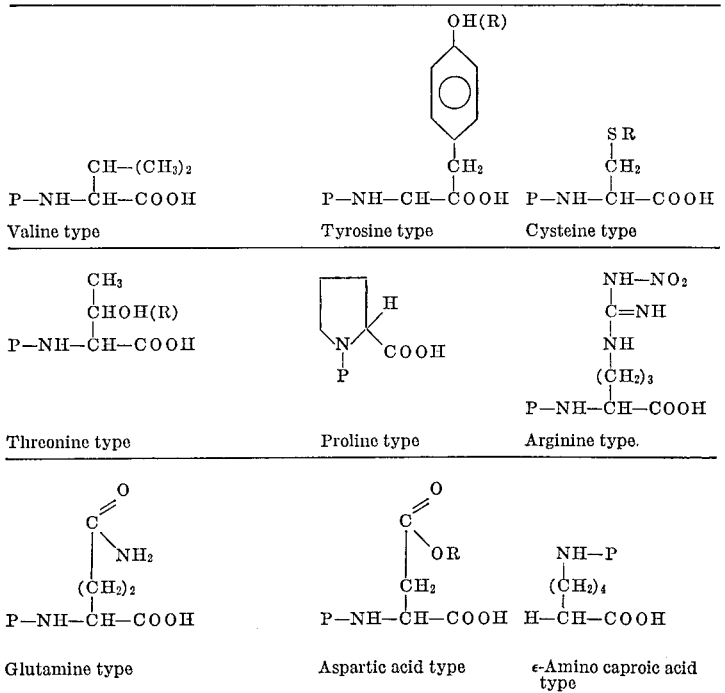

To protect the amino group during esterification, a urethane or sulfenyl group is particularly desirable because of the ease with which the free amino group can be subsequently released. Typical of such protected amino acids are compounds of Formula I above where P is

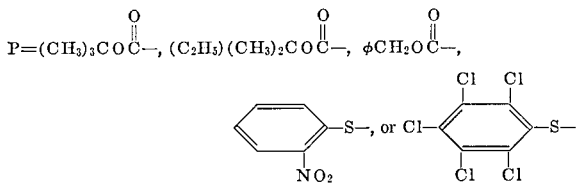

However, the structure of the protective group is not critical provided that it is stable under the mild process conditions. Many other protective groups known in the art can also be used. Also the protective group may itself be another amino acid segment of a polypeptide.

To form the sulfonium carboxylate salt from the sulfonium resin and N-protected amino acid requires a base to neutralize the amino acid. In a preferred embodiment, the amino acid is contacted with the sulfonium resin in a basic salt form. Alternately a suitable soluble amino acid salt preformed by neutralization of the amino acid with sodium hydroxide, potassium carbonate, triethyl amine, tetramethylene ammonium hydroxide or the like can be used. Monovalent cationic salts are generally preferred because of greater solubility. Of course the amino acid can also be neutralized in situ by adding a suitable base to the slurry of amino acid and resin when a nonbasic sulfonium salt is employed.

Arylmethylene sulfonium resins (II)

The second reactant is an arylmethylene sulfonium polymer of the Formula II:

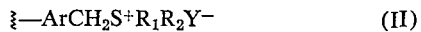

where

—ArCH₂— is a polymer containing arylmethylene groups, R₁ and R₂ individually are C₁-C₄ alkyl or C₂-C₄ hydroxyalkyl groups, or together are —(CH₂)$_m$— where $m$ is 4 or 5, and Y⁻ is an anion.

methyl)diphenyl ether polymer described by Raymond et al. U.S. Patent 3,240,725 is suitable as a supporting resin. Alternately a sulfonium polymer prepared from a halomethylated polyvinylaromatic resin as described by Hwa U.S. Patent 2,895,925 can be used. Another synthesis of a suitable arylmethylene sulfonium polymer is described by Hatch et al. U.S. Patent 3,078,259.

Particularly suitable are sulfonium salts derived from microporous and macroporous chloromethylated styrenedivinylbenzene resins used in the commercial synthesis of ion-exchange resins. These polymers of styrene crosslinked with from 2–20% or more divinylbenzene are available in a convenient bead form with about 0.05–1.0 chloromethyl groups per aromatic group. When using such a resin, the initial degree of chloromethylation is a major factor in determining the final benzyl ester content of the product.

For preparing low molecular weight peptides, a lightly crosslinked styrene-divinylbenzene resin with an average of about 0.3–1.0 chloromethyl groups per aromatic group is useful. For synthesizing large peptides or modifying proteins a more highly crosslinked and rigid supporting resin with an average of about 0.05–0.4 chloromethyl groups per aromatic group is preferred. In terms of resin capacity such chloromethyl resin can be converted into amino acid resins containing about 0.1–4.0 meq. benzyl ester/g. dry weight.

Reaction of such a chloromethyl resin with an organic sulfide yields a sulfonium resin in a stable chloride form.

For use herein a dialkyl or a C₄-C₅ cycloalkylene sulfonium salt is preferred, such as the salt obtained by reaction of a chloromethylated polymer with dimethyl sulfide, methyl butyl sulfide, thiodiglycol, tetrahydrothiophene or hexahydrothiopyran. Particularly desirable is a dimethyl sulfonium salt because of the volatility of the by-product sulfide formed in the subsequent esterification step.

Normally sulfonium salts have a halide counteranion, i.e., Y⁻ is chloride or bromide. However, the anion Y⁻ can also be nitrate, acetate, sulfate, bisulfate, carbonate, bicarbonate, hydroxide or other common water soluble anion. The sulfonium salts can be converted from one anionic form to another by standard ion-exchange techniques.

Highest yields of the amino acid resin benzyl ester are obtained when a basic sulfonium salt reacts with an amino acid. The $Y^-$ is a basic anion. Neutralization of the basic sulfonium resin by the amino acid occurs to form the carboxylate salt (III). Preferably the basic anion is bicarbonate, carbonate, or hydroxide. Since only water and/or carbon dioxide are formed when these basic salts are neutralized, the amino carboxylate anion is the sole remaining nucleophile for reaction with the sulfonium resin.

Process conditions

Reaction of the N-protected amino acid (I) and the arylmethylene sulfonium resin (II) is achieved by contacting the resin with a solution of the amino acid in a polar hydroxylic solvent such as water, aqueous alcohol, or an alcohol-chlorinated hydrocarbon mixture such as methanol-methylene chloride or isopropyl alcohol-methylchloroform. A non-aqueous solvent has the advantage of minimizing hydrolysis of the sulfonium salt. To increase the solubility of the amino acid a water miscible solvent such as dioxane, tetrahydrofuran or dimethylformamide can be used. The resin itself is advantageously used in a prewet or solvent swollen form.

Normally about 1.0–1.1 equivalents of the amino acid should be used per equivalent of sulfonium resin. Excess of amino acid can be used and recovered. However, a deficiency should be avoided to minimize formation of undesirable resin substituent groups.

Formation of a sulfonium amino carboxylate salt by neutralization of a basic sulfonium resin or by ion-exchange with a neutral sulfonium resin occurs readily on mixing the resin and amino acid solution at room temperature. If a neutral sulfonium salt is used, the amino acid should be added as a salt or neutralized in situ with an added soluble base.

In the preferred process where a basic sulfonium resin is reacted with an N-protected amino acid, the water and solvent are advantageously stripped from the reactant mixture, preferably in vacuo at about 20–50° C., before heating at 40–100° C. to complete the esterification. Excellent yields are obtained by contacting a sulfonium bicarbonate resin with a solution of the N-protected amino acid, followed by stripping the solvent in vacuo at 25–35° C. for 1–3 hours and then heating at 75–90° C. for about 5 hours. When a neutral sulfonium salt is used, heating the slurry of resin and neutralized amino acid for 10–50 hours at 40–100° C. is usually required for best yields.

The superiority of this improved process for the synthesis of the amino acid resin benzyl ester has been fully demonstrated with a broad range of N-protected amino acids. High yields and resin capacities with no detectable racemization have been obtained under mild conditions. N-protected amino acid resin esters prepared by this process have been successfully used for the solid-phase synthesis of various kinin-like peptides.

To illustrate further the present process and the improved results obtained thereby, the following examples are given. Unless otherwise indicated, all parts and percentages are by weight.

Example 1.—Arylmethylene sulfonium resin (A) A slurry of 25 parts (113 mmoles-$CH_2Cl$) of a chloromethylated styrene-2% divinylbenzene copolymer resin (200–400 mesh; 4.53 meq. Cl/g.), 13 parts (210 mmoles) dimethyl sulfide, 75 parts water, 60 parts methanol, and 100 parts methylene chloride was stirred 4.5 days at room temperature. The swollen resin was recovered by filtration and washed successively with aqueous dioxane, dilute HCl in dioxane, aqueous methanol, and water. Analysis of the wet dimethyl sulfonium resin (136 parts, 80% $H_2O$) established a 95% conversion to the sulfonium chloride salt.

(B) In a similar manner 20 parts (66.4 mmoles-$CH_2Cl$) of a chloromethylated styrene-2% divinylbenzene copolymer resin was treated with 12 parts (137 mmoles) of tetrahydrothiophene in methanol-methylene chloride. After 6 days at room temperature, 87.5 parts of resin were recovered with 91.6% conversion to the tetramethylene sulfonium chloride salt, 3.4% hydrolysis and 5% residual chloromethyl groups.

(C) Other sulfonium resins have been similarly prepared using diethyl sulfide, di(2-hydroxyethyl) sulfide (thiodiglycol), styrene-divinylbenzene resins of varied crosslinking, chloromethyl(methylenediphenyl ether) polymers, etc.

Example 2.—Basic sulfonium resin salts (A) An aqueous slurry of 119 parts (93.8 meq. $Cl^-$) of the dimethyl sulfonium chloride resin of Example 1A was placed in a glass column and drained free of water. Then 250 parts of 1 N aqueous $KHCO_3$ was passed slowly through the resin column. Analysis of the eluent showed a 99.5% exchange of the chloride counterion and conversion into the bicarbonate salt form. The resin was washed with water and 139 parts of wet dimethyl sulfonium bicarbonate resin recovered. By titration the wet resin contained 0.65 meq. $HCO_3^-$/g.

(B) In a similar manner 39.2 parts (25.1 meq. $Cl^-$) of a dimethyl sulfonium chloride resin was converted to the carbonate salt form by ion-exchange with 190 parts of 1 N $K_2CO_3$. The resulting 29.5 parts of light tan resin contained 0.730 meq. $CO_3^=$/g. wet resin.

(C) Conversion of 66.8 parts (45.8 meq. $Cl^-$) of the tetramethylene sulfonium chloride resin of Example 1B into the bicarbonate form was accomplished by ion-exchange with 150 parts of 1 N potassium bicarbonate. The resulting resin contained 0.578 meq. $HCO_3^-$/g. wet resin.

Example 3.—Esterification of N-protected L-valine (A) To a suspension of 3.80 parts (2.12 meq. $HCO_3^-$) of the dimethylarylmethylene sulfonium bicarbonate resin of Example 2A was added a solution of 0.502 (2.31 mmoles) of N-t-butyloxycarbonyl-L-valine in 10 parts of dioxane. The mixture was stirred at room temperature until evolution of $CO_2$ ceased in about 15 min. The resin was recovered and washed thoroughly with dioxane. The combined filtrates and washings were evaporated to recover 0.042 parts (0.19 mmole) of unreacted L-valine.

The wet resin, 5.595 parts, was dried in vacuo over solid KOH for 3 hours at 25–35° C. yielding 2.442 parts of partially esterified resin. To complete the esterification, the solid resin was heated in vacuo at 80° C. for 3.75 hrs. The resulting resin, 2.021 parts, was washed with methylene chloride and redried.

Analysis of the L-valine resin benzyl ester by hydrolysis with HCl in acetic acid indicated complete esterification with 2.02 mmoles (95%) of L-valine attached thereby to the styrene-divinylbenzene resin. The dry resin contained 1.00 meq. N-t-butyloxycarbonyl-L-valine/g. Rotational values for L-valine recovered after hydrolysis of a sample of the resin ester with HBr in trifluoroacetic acid established that within experimental error, no racemization had occurred during esterification with the sulfonium resin.

(B) In another run, a dioxane solution of N-t-butoxycarbonyl-L-valine was added to a column of dimethyl sulfonium bicarbonate resin and the mixture agitated until $CO_2$ evolution ceased. The resin was then removed from the column, dried in vacuo at 25–35° C. for 2 hours, heated at 80° C. for 4 hours, washed with methylene chloride, and redried at 45° C. in vacuo for 2 hours. The resulting amino acid resin ester contained 2.40 meq. L-valine/g. with a 95% conversion of the sulfonium resin into the amino acid ester.

(C) A slight excess of a dioxane solution of N-t-butoxycarbonyl-L-valine was stirred with a portion of the tetramethylenearylmethylene sulfonium bicarbonate resin described in Example 2C. Esterification was carried out as described in Example 3A yielding a resin containing 1.61 meq. L-valine/g. with a 98% conversion of the sulfonium salt into an amino acid ester. By analysis about 70% of the resin ester was the benzyl ester and about 30% a by-product benzylthiolbutyl ester from reaction of the aminocarboxylate with the tetramethylenesulfonium ring.

(D) The procedure of Example 3B was repeated with 3.088 parts (1.72 meq. $HCO_3^-$) of the dimethyl sulfonium bicarbonate resin and 0.403 part (1.86 mmoles) N-t-butoxycarbonyl-L-valine to obtain a dry partially esterified resin. Then to complete the esterification, the resin was refluxed with benzene removing the residual water azeotropically at the same time. After 4.5 hours reflux the resin was recovered, washed and dried, weight 1.59 parts. The esterified resin contained 1.01 meq. L-valine/g. with a 93% conversion to the amino acid benzyl ester.

(E) To a solution of 2.12 parts (9.75 mmoles) N-t-butoxycarbonyl-L-valine and 0.89 part (8.8 mmoles) triethylamine in 15.8 parts 95% ethanol was added 5.0 parts (5.70 mmoles) of a dimethyl sulfonium chloride resin. The solution was stirred at reflux for 48 hours and then the resin was recovered, washed and dried to yield 5.09 parts of esterified resin. The esterified resin contained 0.82 meq. valine/g. with a yield of ester based on the original sulfonium content of 73%.

Example 4.—Esterification of other N-protected amino acids

Table I presents typical data from resin esterifications carried out with various styrenedivinylbenzene resin methylene sulfonium salts and N-protected amino acids using the general procedure of Example 3.

support as a benzyl ester, the improvement which comprises:

(A) Contacting in the presence of a polar water-miscible solvent
  (1) a solid arylmethylene sulfonium resin containing a plurality of benzyl sulfonium groups of the formula

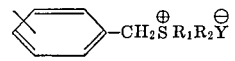

where $R_1$ and $R_2$ independently are $C_1$–$C_4$ alkyl or $C_2$–$C_4$ hydroxyalkyl groups, or together are $-(CH_2)_m-$ where $m$ is 4 or 5; and $Y^\ominus$ is a water soluble anion; and (2) a solution of an N-protected amino acid or salt thereof of the formula:

PNH—CHR—COOM where

P is an amine protective group useful in peptide synthesis,

R is the remaining portion of the amino acid, and

M is a monovalent cation;

to form a sulfonium carboxylate salt, and thereafter (B) heating the sulfonium carboxylate salt to bond the N-protected amino acid to the solid aromatic resin as a benzyl ester thus providing a solid support suitable for solid-phase peptide synthesis by sequential deblocking and peptide-forming steps.

2. The process of claim 1 where the aromatic resin is a styrene-divinylbenzene copolymer.

3. The process of claim 1 where $Y^-$ is a basic anion.

TABLE I.—ESTERIFICATION OF SULFONIUM RESINS WITH N-PROTECTED AMINO ACIDS

| | N-protected amino acid [a] | Sulfonium resin $\}-ArCH_2-$ | Resin ester Percent conversion [b] | Resin ester Meq. amino acid/g. |
|---|---|---|---|---|
| Example: | | | | |
| 3A | N-BOC-L-valine | $-\overset{+}{S}(CH_3)_2 HCO_3^-$ | 95 | 1.00 |
| 3B | do | $-\overset{+}{S}(CH_3)_2 HCO_3^-$ | 95 | 2.40 |
| 3C | do |  $HCO_3^-$ | [c] 100 | 1.60 |
| 3D | do | $-\overset{+}{S}(CH_3)_2 HCO_3^-$ | 93 | 1.01 |
| 3E | do | $-\overset{+}{S}(CH_3)_2 Cl^-$ | 73 | 0.82 |
| 4A | N-BOC-O-benzyl-L-tyrosine | $-\overset{+}{S}(CH_3)_2 HCO_3^-$ | 92 | 0.832 |
| 4B | N-BOC-L-proline | $-\overset{+}{S}(CH_3)_2 HCO_3^-$ | 93 | 2.35 |
| 4C | do | $-\overset{+}{S}$ $HCO_3^-$ | [c] 100 | 1.60 |
| 4D | do | $-\overset{+}{S}(C_2H_5)_2 HCO_3^-$ | 96 | 1.43 |
| 4E | N-BOC-L-phenyl-alanine | $-\overset{+}{S}(CH_3)_2 HCO_3^-$ | 87 | 2.08 |
| 4F | N-BOC-$\beta$-benzyl-L-aspartic acid | $-\overset{+}{S}$ $HCO_3^-$ | [c] 98 | 1.41 |
| 4G | N-BOC-E-amino-caproic acid | $-\overset{+}{S}$ $HCO_3^-$ | [c] 100 | 1.58 |
| 4H | N-NPS-L-glutamine | $-\overset{+}{S}$ $HCO_3^-$ | | 1.21 |
| 4I | N-NPS-L-threonine | $-\overset{+}{S}(CH_3)_2 ½(CO_3^=)$ | 76 | 1.22 |

[a] BOC=t-butyloxycarbonyl; NPS=o-nitrophenylsulfenyl.
[b] Total conversion to ester based on sulfonium salt.
[c] Includes benzyl and methylenethiobutyl ester.

For comparison, previous syntheses amino acid resin esters as reported in the literature by Merrifield and others give about 14–49% conversions to esterified resins containing about 0.17–0.56 meq. amino acid/g.

I claim:

1. In a solid-phase peptide synthesis process where a peptide chain is formed by sequential addition of amino acids to an amino acid bonded to a solid aromatic resin 4. The process of claim 1 where $R_1$ and $R_2$ are methyl group and $Y^-$ is bicarbonate.

5. The process of claim 3 where the solvent is removed at about 20°–50° C. and the residual resin is heated at about 40°–100° C. to yield an amino acid resin ester.

6. The process of claim 5 where the esterified aromatic resin contains about 0.1–4.0 meq. amino acid/g. dry resin.

7. The process of claim 1 where protective amino group P is a t-butoxycarbonyl group.

8. The process of claim 1 where a styrene 2% divinylbenzene copolymer containing a plurality of sulfonium groups of the formula:

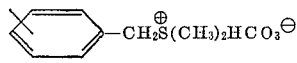

is (A) contacted with a solution of N-t-butoxycarbonyl-L-valine to form the sulfonium carboxylate salt; and thereafter (B) the solvent is removed in vacuo at about 20°–50° C. and the resulting solid resin is heated at about 40°–100° C. to yield an amino acid resin ester containing about 0.8–2.4 meq. L-valine/g.

9. The process of claim 1 where the arylmethylene sulfonium resin has a polyvinylaromatic resin matrix, $Y^\ominus$ is a water-soluble basic anion, and the amino acid is a free amino acid with an N-protective group of the formula

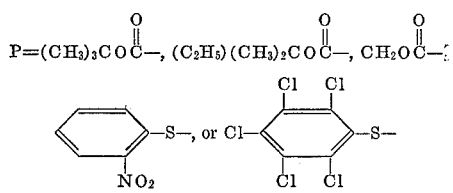

10. The process of claim 1 where the arylmethylene resin is an insoluble polyvinylaromatic resin containing an average of about 0.05–1.0 methylenesulfonium groups per aromatic group, $Y^\ominus$ is a basic anion, the N-protected amino acid is a natural α-amino acid, and the resulting esterified aromatic resin contains about 0.1–4.0 meq. amino acid/g. dry resin.

References Cited
UNITED STATES PATENTS

| | | | |
|---|---|---|---|
| 2,895,925 | 7/1959 | Hwa | 260—2.1 |
| 3,078,259 | 2/1963 | Hatch et al. | 260—79.7 |
| 3,300,416 | 1/1967 | Hatch | 260—2.1 |

OTHER REFERENCES

J. American Chemical Society, 85, pp. 2149–2154, 1963, Merrifield.

HAROLD D. ANDERSON, Primary Examiner

H. SCHAIN, Assistant Examiner

U.S. Cl. X.R.

260—2.1, 112.5

UNITED STATES PATENT OFFICE
CERTIFICATE OF CORRECTION

PO-1050 (5/69)

Patent No. 3,563,958     Dated     16 February 1971

Inventor(s) Linneaus C. Dorman

It is certified that error appears in the above-identified patent and that said Letters Patent are hereby corrected as shown below:

In Column 1 insert the following after the last word in line 59 (an) and before the first word in line 60 (improvement):

— arylmethylene sulfonium resin. More specifically, the —

In Column 2, line 10, change "COON" to — COOM —; in line 15 chan "COOH$_2$Ar" to — COOCH$_2$Ar — and change "w" to — $ — .

In Column 3 change the formula between lines 3 and 12 over Tyrosine type to:

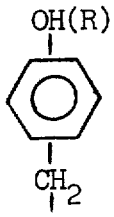

P - NH - CH - COOH

Signed and sealed this 13th day of July 1971.

(SEAL)
Attest:

EDWARD M. FLETCHER, JR.
Attesting Officer

WILLIAM E. SCHUYLER,
Commissioner of Paten